United States Patent
Shoham et al.

(10) Patent No.: US 9,229,690 B2
(45) Date of Patent: Jan. 5, 2016

(54) AUTOMATIC COMPUTER CODE PARALLELIZATION

(71) Applicant: METIS-MP Ltd., Nes Ziona (IL)

(72) Inventors: Efraim Shoham, Shoham (IL); Gil-Ad Meir, Petach-Tikva (IL); Evgeny Maximov, Rishon-LeZion (IL); Ram Segal, Nes Ziona (IL)

(73) Assignee: METIS-MP Ltd., Nes Ziona (IL)

( * ) Notice: Subject to any disclaimer, the term of this patent is extended or adjusted under 35 U.S.C. 154(b) by 0 days.

(21) Appl. No.: 14/458,301

(22) Filed: Aug. 13, 2014

(65) Prior Publication Data

US 2015/0149982 A1    May 28, 2015

Related U.S. Application Data

(60) Provisional application No. 61/909,393, filed on Nov. 27, 2013.

(51) Int. Cl.
*G06F 9/44* (2006.01)
*G06F 9/45* (2006.01)
*G06F 11/34* (2006.01)

(52) U.S. Cl.
CPC ...... *G06F 8/30* (2013.01); *G06F 11/34* (2013.01); *G06F 8/45* (2013.01)

(58) Field of Classification Search
CPC .......... G06F 8/314; G06F 11/34; G06F 8/30; G06F 8/45
USPC .......... 717/106–107, 114–119, 130–133, 149
See application file for complete search history.

(56) References Cited

U.S. PATENT DOCUMENTS

| | | | |
|---|---|---|---|
| 6,434,590 B1 * | 8/2002 | Blelloch et al. | 718/102 |
| 8,161,127 B2 * | 4/2012 | Das et al. | 709/213 |
| 8,230,426 B2 * | 7/2012 | Powers et al. | 718/102 |
| 8,930,956 B2 * | 1/2015 | Blocksome et al. | 718/104 |

OTHER PUBLICATIONS

Ana Varbanescu, "On the Effective Parallel Programming of Multi-core Processors", 2010, thesis, retrieved from, http://www.pds.ewi.tudelft.nl/pubs/ph_d/varbanescu-thesis.pdf, pp. i-ix, 1-217.*
Tristram et al., "Performance optimisation of sequential programs on multi-core processors", 2012, ACM, pp. 119-128.*

\* cited by examiner

*Primary Examiner* — Ted T Vo

(57) ABSTRACT

A method for computer code parallelization, comprising: providing sequential computer code by a user; defining structure of the sequential computer code, the structure comprises a plurality of code processes; generating automatically a plurality of parallelized computer codes corresponding to the sequential computer code, each having different configuration of parallelizing the plurality of code processes; running the plurality of parallelized computer codes on a multi-core processing platform; evaluating performance of the processing platform during running of each of the parallelized computer codes; and ranking each of the parallelized computer codes according to the performance evaluation.

9 Claims, 4 Drawing Sheets

$$\begin{array}{c} \phantom{P1} \quad P1 \quad P2 \quad P3 \\ \begin{array}{c} P1 \\ P2 \\ P3 \end{array} \left[ \begin{array}{ccc} 1 & 0.9 & 1 \\ 0.9 & 0.8 & 0.85 \\ 1 & 0.85 & 0.7 \end{array} \right] \end{array}$$

AUTOMATIC COMPUTER CODE PARALLELIZATION

RELATED APPLICATION

This application claims the benefit of priority under 35 USC 119(e) of U.S. Provisional Patent Application No. 61/909,393 filed Nov. 27, 2013, the contents of which are incorporated herein by reference in their entirety.

FIELD AND BACKGROUND OF THE INVENTION

The present invention, in some embodiments thereof, relates to computer code parallelization and, more particularly, but not exclusively, to automatic computer code parallelization and evaluation.

In recent years most computing platforms have been converted from a single-core processor to a multi-core processor. As a result, code parallelization implementation becomes a significant burden in the development process, and requires highly skilled programmers.

Some automatic code parallelization platforms were developed to relieve programmers from the manual parallelization process. The quality of automatic code parallelization has improved in the past years. However, fully automatic code parallelization is not yet developed due to the need for complex program analysis and the knowledge of unknown factors, such as input data ranges.

SUMMARY OF THE INVENTION

According to some embodiments of the present invention, there is provided a method for computer code parallelization. The method comprises providing sequential computer code by a user, defining structure of the sequential computer code, the structure comprises a plurality of code processes, generating automatically a plurality of parallelized computer codes corresponding to the sequential computer code, each having different configuration of parallelizing the plurality of code processes, running the plurality of parallelized computer codes on a multi-core processing platform, evaluating performance of the processing platform during running of each of the parallelized computer codes, and ranking each of the parallelized computer codes according to the performance evaluation.

Optionally, the method further comprises selecting one of the parallelized computer codes according to the ranking.

According to some embodiments of the present invention, there is provided a system for computer code parallelization. The system comprises a user module for receiving sequential computer code from a user and defining structure of the sequential computer code, the structure comprises a plurality of code processes, a controller module for generating automatically a plurality of parallelized computer codes corresponding to the sequential computer code, each having different configuration of parallelizing the plurality of code processes, a scheduler module for running the plurality of parallelized computer codes on a multi-core processing platform, and a profiler module for evaluating performance of the processing platform during running of each of the parallelized computer codes, and ranking each of the parallelized computer codes according to the performance evaluation.

According to some embodiments of the present invention, there is provided a method for computer code parallelization. The method comprises providing sequential computer code by a user, defining structure of the sequential computer code, the structure comprises a plurality of code processes, generating a parallelized computer code corresponding to the sequential computer code wherein the plurality of code processes are parallelized, generating a virtual multi-core processing platform, the virtual multi-core processing platform is simulated on a different processing platform using software application, and running the computer code on the virtual multi-core processing platform.

According to some embodiments of the present invention, there is provided a system for computer code parallelization. The system comprises a user module for receiving sequential computer code from a user, and defining structure of the sequential computer code, the structure comprises a plurality of code processes, a controller module for generating a parallelized computer code corresponding to the sequential computer code wherein the plurality of code processes are parallelized, a virtual multi-core processing platform is simulated on a different processing platform using software application, and a scheduler module for running the computer code on the virtual multi-core processing platform.

According to some embodiments of the present invention, there is provided a method for computer code evaluation. The method comprises providing computer code by a user, selecting by the user at least one of a plurality of processing platforms, each of the processing platforms having different properties, running the computer code on the at least one of the plurality of processing platforms, and evaluating performance of the computer code on the at least one of the plurality of processing platforms.

Optionally, the computer code is a generated parallelized computer code corresponding to a previously provided sequential computer code and the plurality of processing platforms multi-core processing platforms.

According to some embodiments of the present invention, there is provided a system for computer code evaluation. The system comprises a user module for receiving computer code from a user, a plurality of evaluation modules, each implemented on a processing platforms having different properties, a control server connected to the user module for running the computer code on the at least one of the plurality of evaluation modules selected by the user, and a plurality of profiler modules included in the plurality of evaluation modules for evaluating performance of the computer code on the at least one of the plurality of processing platforms.

According to some embodiments of the present invention, there is provided a method for computer code parallelization. The method comprise providing sequential computer code by a user, presenting each of a plurality of processes of the sequential computer code as an execution graphic element in a schematic chart, presenting each of a plurality of output data blocks of the plurality of processes as a data structure graphic element of a corresponding execution graphic element in the schematic chart, presenting each of a plurality of dependencies between the plurality of processes as a dependency arrow between corresponding execution graphic elements in the schematic chart, identifying non-conflicting execution graphic elements according to the schematic chart, and generating a parallelized computer code corresponding to the sequential computer code wherein processes presented by the non-conflicting execution graphic elements are paralleled.

Optionally, the method comprises presenting each of a plurality of data clusters as data structure manipulation graphic element, operating on corresponding data structure graphic element in the schematic chart.

According to some embodiments of the present invention, there is provided a system for computer code parallelization. The system comprises a user module for receiving sequential computer code from a user, presenting each of a plurality of processes of the sequential computer code as an execution graphic element in a schematic chart, presenting each of a plurality of output data blocks of the plurality of processes as a data structure graphic element of a corresponding execution graphic element in the schematic chart, presenting each of a plurality of dependencies between the plurality of processes as a dependency arrow between corresponding execution graphic elements in the schematic chart, a control server connected to the user module for identifying non-conflicting execution graphic elements according to the schematic chart, and generating a parallelized computer code corresponding to the sequential computer code wherein processes presented by the non-conflicting execution graphic elements are paralleled.

Unless otherwise defined, all technical and/or scientific terms used herein have the same meaning as commonly understood by one of ordinary skill in the art to which the invention pertains. Although methods and materials similar or equivalent to those described herein can be used in the practice or testing of embodiments of the invention, exemplary methods and/or materials are described below. In case of conflict, the patent specification, including definitions, will control. In addition, the materials, methods, and examples are illustrative only and are not intended to be necessarily limiting.

Implementation of the method and/or system of embodiments of the invention can involve performing or completing selected tasks manually, automatically, or a combination thereof. Moreover, according to actual instrumentation and equipment of embodiments of the method and/or system of the invention, several selected tasks could be implemented by hardware, by software or by firmware or by a combination thereof using an operating system.

For example, hardware for performing selected tasks according to embodiments of the invention could be implemented as a chip or a circuit. As software, selected tasks according to embodiments of the invention could be implemented as a plurality of software instructions being executed by a computer using any suitable operating system. In an exemplary embodiment of the invention, one or more tasks according to exemplary embodiments of method and/or system as described herein are performed by a data processor, such as a computing platform for executing a plurality of instructions. Optionally, the data processor includes a volatile memory for storing instructions and/or data and/or a non-volatile storage, for example, a magnetic hard-disk and/or removable media, for storing instructions and/or data. Optionally, a network connection is provided as well. A display and/or a user input device such as a keyboard or mouse are optionally provided as well.

BRIEF DESCRIPTION OF THE DRAWINGS

Some embodiments of the invention are herein described, by way of example only, with reference to the accompanying drawings. With specific reference now to the drawings in detail, it is stressed that the particulars shown are by way of example and for purposes of illustrative discussion of embodiments of the invention. In this regard, the description taken with the drawings makes apparent to those skilled in the art how embodiments of the invention may be practiced.

In the drawings.

DESCRIPTION OF EMBODIMENTS OF THE INVENTION

Figure 1:
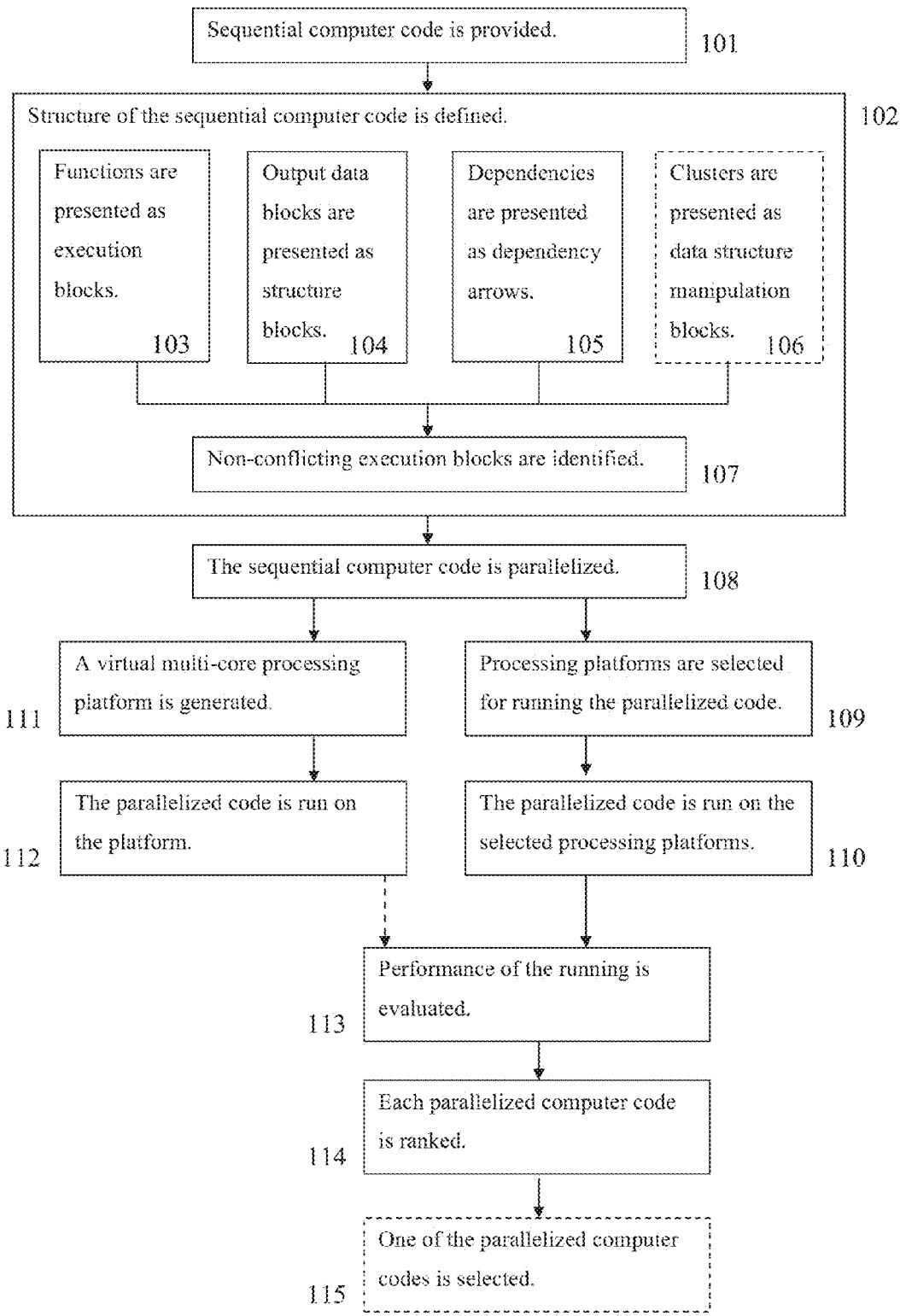
FIG. 1 is a flowchart schematically representing a method for computer code parallelization by evaluating different parallelization configurations, by running the code on a simulated processing platform, by running the code on multiple processing platforms and/or by visualizing the structure of a sequential code in a schematic chart and identifying non-conflicting processes, according to some embodiments of the present invention.

The present invention, in some embodiments thereof, relates to computer code parallelization and, more particularly, but not exclusively, to automatic computer code parallelization and evaluation.

A sequential computer code is a computer code that includes multiple code processes (or functions) and instructions to perform them one after the other by a single core processor. After parallelization, the code becomes a parallelized computer code, with instructions to perform some of the processes simultaneously by different cores of a multi-core processor and/or by different processors. When more processes are performed simultaneously, the parallelization is better and the processing time of the code is shorter. Parallelization of sequential computer code depends on the dependencies between the processes of the code, as dependant processes cannot be performed simultaneously. A dependency may occur, for example, when the output of one process is required as input for a second process.

According to some embodiments of the present invention, there is provided a method for automatic computer code parallelization by evaluating different parallelization configurations. After the structure of the sequential code and dependencies between the processes are defined, multiple parallelized versions of the code are automatically generated, each having different configuration of simultaneously performing the code processes. Each parallelized computer code is then run on a multi-core processing platform and the performance of the processing platform during the running is evaluated. Each parallelized computer codes is then ranked according to the performance evaluation. This method provides the user with the optimal parallelization of the sequential computer code according to the defined structure and processing platform.

Exemplary multi-core processing platform may be, for example, dual-core processor, tri-core processor, quad-core processor, hex-core processor, oct-core processor, multi-core chips mixed with simultaneous multithreading, heterogeneous cores and/or hardware dedicated processing units such as direct memory access (DMA), Multipurpose Applied Physics Lattice Experiment MAPLE of Freescale™ and HWAFFT of Texas Instruments™.

According to some embodiments of the present invention, there is provided a method for computer code parallelization by running the code on a simulated processing platform. A virtual multi-core processing platform that is simulated on a different physical processing platform, such as a user's workstation, by using software application. After parallelization of the sequential computer code, the parallelized computer code is run on the virtual multi-core processing platform. This method allows the user to run the code locally on the existing physical hardware of his workstation while simulating other hardware that needs to be tested with the code. Therefore, the code may be tested for any hardware, regardless of the user's existing physical hardware.

According to some embodiments of the present invention, there is provided a method for computer code evaluation by running it on multiple processing platforms. The method includes providing computer code by a user developing a computer code, sequential or parallelized, is provided with remote access to multiple processing platforms, each having different properties. The user selects one or more of the platforms to run his code. The computer code is then run on the selected processing platforms and the performance of the computer code on each processing platform during the running is evaluated. This method allows the user to run the code on multiple platforms of different hardware and determining the optimal processor and required memory in an early stage of the software development process. Therefore, the code may be tested on any hardware, regardless of the user's physical hardware.

According to some embodiments of the present invention, there is provided a method for computer code parallelization by visualizing the structure of a sequential code in a schematic chart and identifying non-conflicting processes. A schematic chart is presented to a user, where each process of the sequential computer code is visualized as an execution graphic element, each output data block is visualized as a data structure graphic element and each dependency between the processes is visualized as a dependency arrow between the corresponding execution graphic elements. Non-conflicting execution graphic elements, that represent processes with no mutual dependency, are then identified according to the schematic chart and a parallelized computer code corresponding to the sequential computer code is generated so the processes presented by the non-conflicting execution graphic elements are paralleled. The method provides a user interface for a full dependency mapping of a given computer code that is implemented in a sequential manner and allows automatic execution of the code in a parallelized form on any multi-processor platform.

Combination of the above methods provides an automatic way to manage multi-tasked algorithms by the constructing and testing of parallelized computer code on many multi-processor platforms.

Before explaining at least one embodiment of the invention in detail, it is to be understood that the invention is not necessarily limited in its application to the details of construction and the arrangement of the components and/or methods set forth in the following description and/or illustrated in the drawings and/or the Examples. The invention is capable of other embodiments or of being practiced or carried out in various ways.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 2:
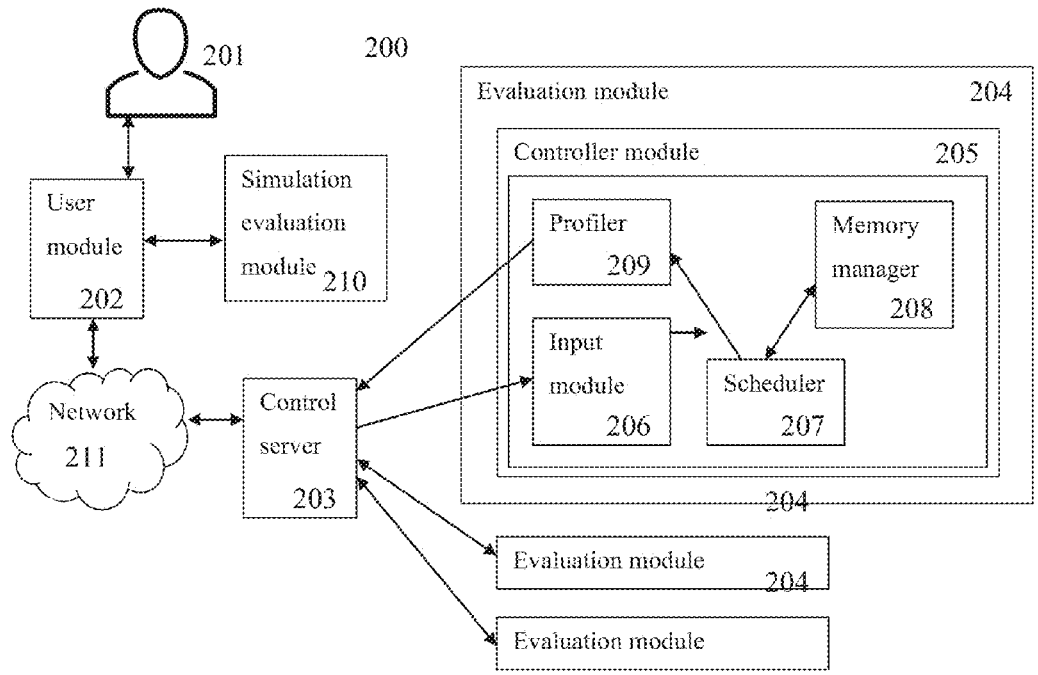
FIG. 2 is a schematic illustration of a system for computer code parallelization, implementing the method of FIG. 1, according to some embodiments of the present invention.

Referring now to the drawings, FIG. 1 is a flowchart schematically representing a method for automatic computer code parallelization, by evaluating different parallelization configurations, by running the code on a simulated processing platform, by running the code on multiple processing platforms and/or by visualizing the structure of a sequential code in a schematic chart and identifying non-conflicting processes, according to some embodiments of the present invention. Reference is also made to FIG. 2, which is a schematic illustration of a system for computer code parallelization, implementing the method of FIG. 1, according to some embodiments of the present invention.

System 200 includes a user module 202 that includes user interface. User module 202 may be a program installed on the user's workstation, personal computer, tablet computer and/or any other platform. User module 202 may also be a webpage operated through a browser program.

First, as shown at 101, sequential computer code is provided by a user 201 through user module 202. The sequential computer code may be of any programming language, such as C, C++, Fortran, Pascal, Pert, and/or any other language. The sequential computer code may be provided by selecting a file that contains the code. The file is then loaded from a workstation of user 201 to user module 202.

Optionally, specific requirements exist for the data input file.

Optionally, when the file does not meet some of the requirements, necessary changes are suggested.

Optionally, user 201 also provides, through user module 202, input data to be used for the execution of the code. Optionally, specific requirement exist for the data input file, for example compliance with known encoding format such as Moving Picture Experts Group 4 (MPEG4) for video data.

Optionally, sequential computer code and/or input data provided by user 201 through user module 202 comply with a predefined application programming interface (API) to allow easy manipulation of processes and data.

System 200 also includes a control server 203 that receives the sequential computer code and/or input data from user module 202. Control server 203 may be, for example, a remote server connected to user module 202 via a network 211. Network 211 may be, for example, by a local area network (LAN) through Ethernet, to wireless local area network (WLAN), cellular network, Bluetooth, universal serial bus (USB), Fire-Wire, Thunderbolt and/or any other communication method.

Then, as shown at 102, structure of the sequential computer code, having multiple code processes, is defined according to the dependencies between the processes. This may be done through the user interface of user module 202, automatically by user module 202 and/or control server 203, and/or semi-automatically.

Optionally, the defining of the structure is done by creating an algorithm schematic chart. The schematic chart is visualized and presented to user 201 through the user interface of user module 202, for example on a screen. The chart may be created automatically or manually by the user as illustrated on FIG. 3 and FIG. 4.

The schematic chart contains graphic elements that visually represent elements of the code, such as processes, data blocks, dependencies, input and output buffers and/or clusters.

Figure 3:
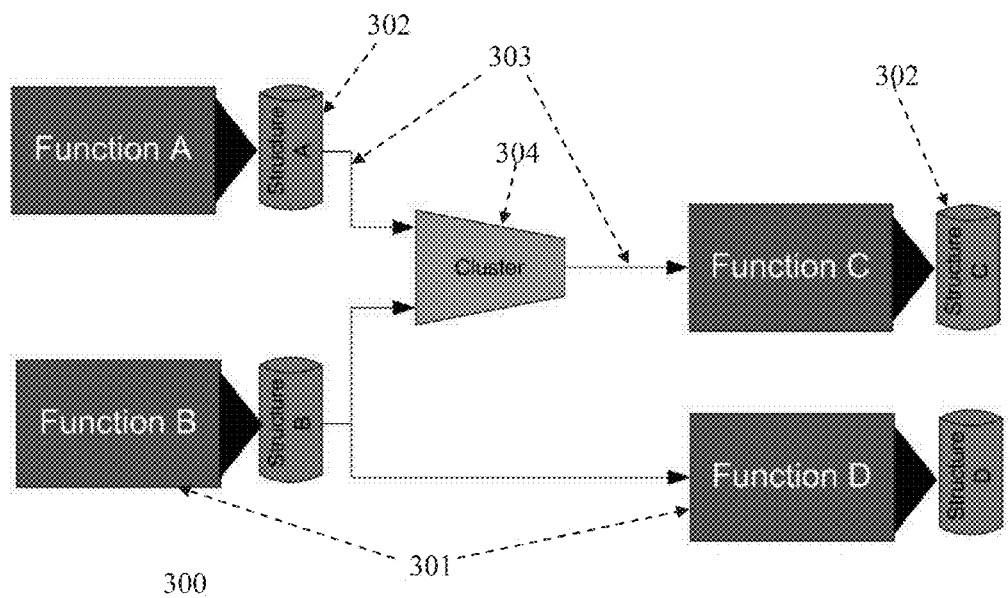
FIG. 3 is a schematic illustration of an exemplary algorithm schematic chart, according to some embodiments of the present invention.

Reference is now made to FIG. 3, which is a schematic illustration of an exemplary algorithm schematic chart presented to a user to assist him in defining the structure of a code, according to some embodiments of the present invention.

As shown at 103, each process of the sequential computer code is presented as an execution graphic element 301 in schematic chart 300. Each execution graphic element 301 represents a single algorithmic block that may be executed.

As shown at 104, each output data block of each process of the sequential computer code is presented as a structure graphic element 302 of a corresponding execution graphic element 301 in schematic chart 300. One or more of structure graphic elements 302 may also be an input to one or more of execution graphic elements 301. Structure graphic elements 302 may also contain information, such as type definition that defines the proper way to use the data, ordered or unordered.

As shown at 105, each dependency between processes of the sequential computer code is presented as a dependency arrow 303 between corresponding execution graphic elements 301 in schematic chart 300. Dependency arrows 303 may also be accompanied by information, such as the amount of data that flows between the processes and/or the delay between the executions of the two connected graphic elements.

Optionally, as shown at 106, each cluster of data is in the sequential computer code is presented as a data structure manipulation graphic element 304 that operates on corresponding structure graphic element(s) 302.

Then, as shown at 107, non-conflicting execution graphic elements 301 in schematic chart 300 are identified. Also, non-conflicting structure graphic elements 302 are identified.

Block 403 is an example for a block that cannot be parallelized autonomously.

System 200 also includes multiple evaluation modules 204 connected to control server 203, each implemented separately on a multi-processor platform with different configurations and/or features, for example evaluation boards such as Texas Instruments™ Davinci, Freescale™ StarCore, CORETEX-M™, PowerPC, and Intel™ Core.

The evaluation modules 204 are implemented as an abstract layer there is no need for an operating system. For example, the operating system (OS) is not required for the scheduling. The OS is used for all other communications such as Ethernet and other system infrastructures which are not related to code parallelization. Control server 203 controls and automatically modifies running configuration for each evaluation module 204 separately, such as providing different codes and processes dependencies. This architecture allows user 201 to remotely upload a sequential computer code to control server 203 and run it offline on one or more remote evaluation modules 204.

Each evaluation module 204 includes a controller module 205 that is an envelope layer that coordinates the operation of evaluation module 204. Evaluation module 204 may be connected to control server 203 by any kind of connection and/or network, as described above. Optionally, controller module 205 monitors progress of the code execution and saves a log file for analysis by user 201. The log file may be transferred to user module 202 by control server 203.

Then, as shown at 108, the sequential computer code is parallelized to generate a parallelized computer code corresponding to the sequential computer code, so the multiple code processes are parallelized. This is done by adding to the sequential computer code instructions to perform some of the processes simultaneously by different cores of a multi-core processor and/or by different processors. When an algorithm schematic chart is used for defining the structure of the sequential computer code, the sequential computer code is parallelized so the processes presented by the non-conflicting execution graphic elements are paralleled.

The parallelized computer code is generated to be executed by a multi-processor system, so each core executes one process at any time and different cores may execute different instances of the same process, with different data. Parallelization can be modeled for a given hypothetical hardware with any given number of cores and estimated processing time for each algorithm block. Simulated profiling graph can be provided by the system hence can help the user choose an optimal and cost effective computing platform.

Optionally, multiple parallelized computer codes are automatically generated, each having different configuration of parallelizing the code processes. For example, in one configuration, a first process is to be performed simultaneously with a second process while a third process is performed separately, and in a second configuration, the first process is to be performed simultaneously with the third process while the second process is performed separately. Optionally, this is done by the controller module 205 of each evaluation module 204.

Then, as shown at 109, one or more processing platform is selected for running the parallelized computer code. Each of the processing platforms has different properties, such as number of cores, number of processors, clock rate, estimated algorithm block's duration, memory architecture, type, size and/or bandwidth.

Each of the processing platforms is implemented with an evaluation module 204 which operates the processing platform.

Each evaluation module 204 may include an input module 206 that streams data received from control server 203 as input for the code currently run by the evaluation module 204. Optionally, the input data is sent to control server 203 by user module 202.

Each evaluation module 204 also includes scheduler module 207 that distributes existing tasks between processors and/or cores. The distribution is done according to the instructions simultaneous execution of processes that was added when the code was parallelized.

Optionally, scheduler module 207 defines latency dependencies data and dependencies for all processes between each other and themselves. The schematic chart may be used by the user as a platform to define dependencies. The output may be for example an XML file to be used by the scheduler module 207.

Figures 4, 5:
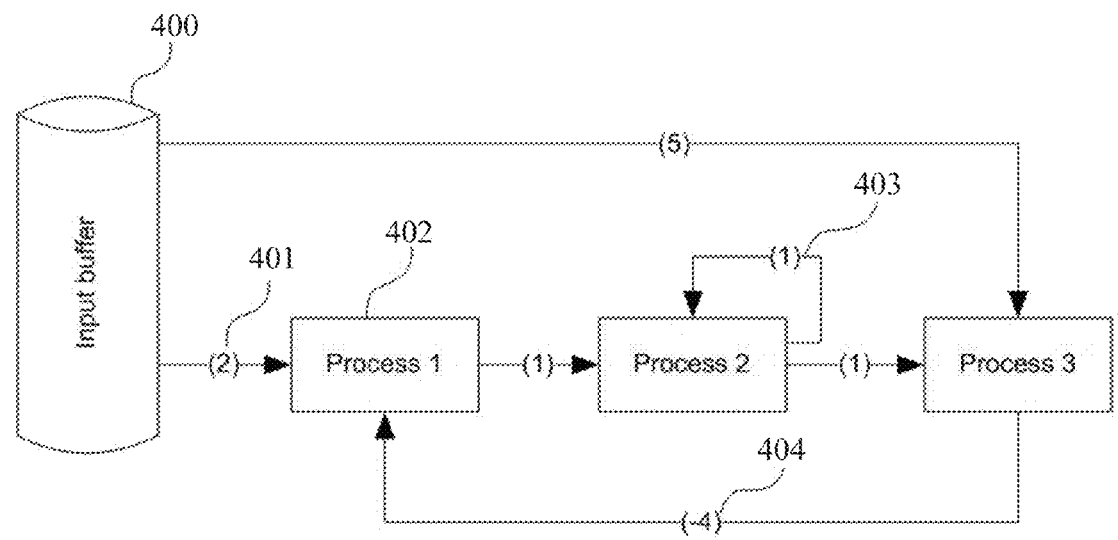
FIG. 4 is a schematic illustration of an exemplary algorithm block dependencies graph, according to some embodiments of the present invention.
FIG. 5 is an exemplary priority weight matrix, according to some embodiments of the present invention.

Reference is now made to FIG. 4, which is a schematic illustration of an exemplary algorithm block dependencies graph, according to some embodiments of the present invention. Input buffer 400 represents the data source of the algorithm; however, more than one input buffer may be used. Dependency 401 presents a delay of two data frames, block 402 represents Process 1. Dependency 403 represents a self-dependency of Process 2, meaning this process depends on a previous iteration of Process 2, so Process 2 cannot be paralleled to itself (two instances of the process, with different data, cannot be executed simultaneously). Dependency 404 sets the maximum latency between Process 1 and Process 3 to be four data frames.

Optionally, scheduler module 207 defines core priority that determines the order of idle cores to utilize for execution of processes.

Optionally, scheduler module 207 also defines process priority that determines the order of processes execution on each core.

Optionally, scheduler module 207 determines the affinity of all processes.

Optionally, scheduler module 207 defines a priority weight matrix in order to determine the parallel efficiency between processes. Scheduler module 206 evaluates the interference between every two processes and gives each pair of processes a value between 0.5 and 1 that represents parallel efficiency, when both are executed simultaneously. A value of 0.5 represents the worst parallelism or the highest interference level between two processes and a value of 1 represents the best parallelism or no interference at all. Reference is now made to FIG. 5, which is an exemplary priority weight matrix, according to some embodiments of the present invention. The 3×3 matrix represents each pair's efficiency factor. 501 represents the parallel efficiency of Process 3 (P3) and Process 1 (P1). 502 represent the efficiency of process 2 (P2) parallel to itself. The matrix may be calculated based on an estimated value given by the user while during testing process execution; the profiler updates optimal value(s).

Each evaluation module 204 may also include a memory manager module 208 that is responsible for managing the data structures used during execution of processes. Data structures may be used, for example, as input for the processes, as output of the processes, and/or for input and output buffer, for example for debugging and verification purposes.

Data structures may include, for example, Heap data structures that are required for allocating data with different sizes, types, alignment, and properties; Cyclic buffers with FIFO (First in—Random access out; Random access in—Order out; Random access in & out) access; Pool data structures that are required for allocating data blocks with union size such as linked lists; and/or High level data structures such as Hash tables, Linked lists, Trees, Graphs, etc.

Optionally, input and output data is stored in designated cyclic buffers that are continuous while having fixed size. This allows scheduler module 206 to call different data during execution of processes, store process output for later use, prepare process input for other processes and/or manage the overall progress of execution.

Optionally, data transaction routines are available for data transfer between different cores and\or different data structures. For example, direct memory access (DMA) and memory management unit (MMU) transactions are profiled and shown as extra cores that are limited to data transaction actions only.

Optionally, memory manager module 208 also controls cache coherency and profile transactions. This may be implemented by the scheduler which controls the memory path allocated for the different cores. The memory manager module 208 holds a list of all memory structures (e.g. types and properties) and responsible to coherently select the specific cores according to the requirement(s) of the scheduler.

Optionally, memory manager module 208 also performs data tracking. For example, monitoring all data structures for read\write access violations and/or profiling all read\write access. Optionally, data structures are set to calculate cyclic redundancy check (CRC) tables for the inserted data.

Then, as shown at 110, the parallelized computer code is run on the selected multi-core processing platform(s). When multiple parallelized computer codes are generated, each of the parallelized computer codes is run separately. Optionally, this is performed by scheduler module 206 and triggered by controller module 205.

Optionally, the running may be performed on a virtual processing platform implemented with a simulation evaluation module 210, as shown at 111 and 112. A virtual multi-core processing platform simulated on a different processing platform using software application, is generated. The different processing platform may be, for example, the workstation of user 201 and/or a network server.

Optionally, simulation evaluation module 210 is generated as part of control server 203 and/or user module 202. Then, the parallelized computer code is run on the virtual multi-core processing platform. The simulation may be executed on general purpose computer hardware such as a personal computer or a server, rather than on an embedded platform. The different cores are simulated by the general purpose computer hardware by creating multi-threading tasks. Bit-exactness is maintained as the same code is executed on the embedded system and the general purpose computer hardware. In case bit-exactness is not maintained it may indicate the dependencies directed by the user are not accurate. In such event the system may alert the user. This allows user 201 to modify the algorithm independently of physical hardware, utilizing the ease of use of known development environments such as Microsoft Visual Studio and/or Eclipse and/or to explore parallelization configurations, while assuring immediate portability to the selected hardware.

Each evaluation module 204 also includes a profiler module 209 that collects data on the performance capabilities of the processor, such as the average start and finish time of each task. Profiler module 209 may then establish benchmark results and performance analysis of a given algorithm for the specific hardware configuration of evaluation module 204. Profiler module 209 tracks at any given moment all processors/cores that execute processes.

Profiler module 209 may support advanced measurements options which may exist in some of the processors, such as I-Cache Hit/Miss, Cache Hit/Miss, Hold associated with data accesses, Hold due to WRQ or the WTB, D-Cache Hit/Miss, Hold due to D-Cache system, I-Cache Hit/Miss and/or Hold due to I-Cache system.

Then, as shown at 113, performance of the running of the parallelized computer code(s) on the selected multi-core processing platform(s) is evaluated by profiler module 209. Data from profiler module 209 may include, for example, average, minimum and/or maximum execution times for every process, distribution of tasks between cores, function calls and/or execution profile.

Figure 6:
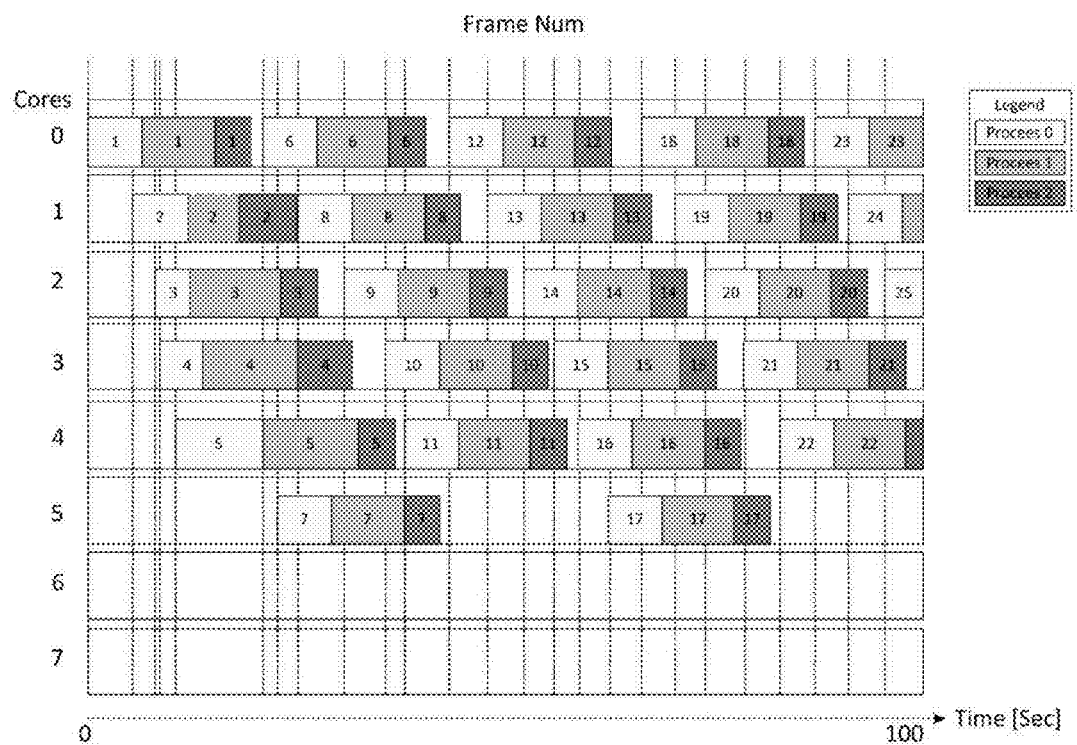
FIG. 6 is a graph of process execution on multiple cores over time of an exemplary parallelized computer code, according to some embodiments of the present invention.
Figure 7:
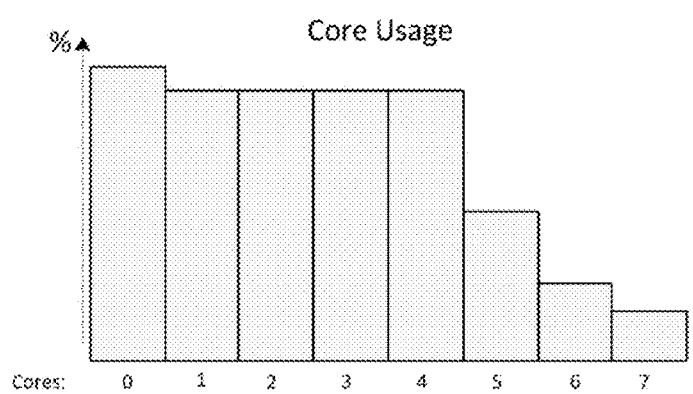
FIG. 7 is a graph of overall core usage of the multiple cores of FIG. 6, according to some embodiments of the present invention.

The data from profiler module 209 may be transferred to user 201. Profiler module 209 may provide live view of the performance of the cores/processors, for example through control server 203 and user module 202 to user 201. Profiler module 209 may have exporting capabilities for off-line, detailed inspection of the information by user 201, for example by creating a file that may be downloaded by a user 201. The information may be presented and/or visualized for user 201, for example using graphs. Reference is now made to FIG. 6, which is a graph of process execution on multiple cores over time of an exemplary parallelized computer code, according to some embodiments of the present invention. The graph may help user 201 to evaluate the efficiency of the parallelization. Reference is also made to FIG. 7, which is a graph of overall core usage of the multiple cores of FIG. 6, according to some embodiments of the present invention. The graph may help user 201 to evaluate the relative load on each core.

When multiple parallelized computer codes are generated, each of the parallelized computer codes is ranked according to the evaluation, as shown at 114.

For example, the parallelized computer code that was executed faster is ranked higher. Optionally, this is done using priority weight matrix. Such a matrix defines the interactions between blocks. Efficiency of every block is ranked.

Optimization may take into consideration minimizing the interaction delay.

For example, referring to FIG. 5 and assuming two cores in process executing P1 and P3, and assuming the scheduler defines that P2 and P3 may be executed simultaneously; the optimum is defined as follows:

V=(P12*P32, P13*P33) where $P_{mn}$, denotes a matrix element m,n.

The optimum may be determined by: Max(V)

where the function to be optimized is $Vn = \Pi_{\forall CM} Pmn$ where M denotes group of existing running processes.

Optionally, as shown at 115, one of the parallelized computer codes is selected according to the ranking, as the optimal parallelized computer code for the specific hardware.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

It is expected that during the life of a patent maturing from this application many relevant automatic computer code parallelization methods and systems will be developed and the scope of the term automatic code parallelization is intended to include all such new technologies a priori.

The terms "comprises", "comprising", "includes", "including", "having" and their conjugates mean "including but not limited to". This term encompasses the terms "consisting of" and "consisting essentially of".

The phrase "consisting essentially of" means that the composition or method may include additional ingredients and/or steps, but only if the additional ingredients and/or steps do not materially alter the basic and novel characteristics of the claimed composition or method.

As used herein, the singular form "a", "an" and "the" include plural references unless the context clearly dictates otherwise. For example, the term "a compound" or "at least one compound" may include a plurality of compounds, including mixtures thereof.

The word "exemplary" is used herein to mean "serving as an example, instance or illustration". Any embodiment described as "exemplary" is not necessarily to be construed as preferred or advantageous over other embodiments and/or to exclude the incorporation of features from other embodiments.

The word "optionally" is used herein to mean "is provided in some embodiments and not provided in other embodiments". Any particular embodiment of the invention may include a plurality of "optional" features unless such features conflict.

Throughout this application, various embodiments of this invention may be presented in a range format. It should be understood that the description in range format is merely for convenience and brevity and should not be construed as an inflexible limitation on the scope of the invention. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 3, 4, 5, and 6. This applies regardless of the breadth of the range.

Whenever a numerical range is indicated herein, it is meant to include any cited numeral (fractional or integral) within the indicated range. The phrases "ranging/ranges between" a first indicate number and a second indicate number and "ranging/ranges from" a first indicate number "to" a second indicate number are used herein interchangeably and are meant to include the first and second indicated numbers and all the fractional and integral numerals therebetween.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable subcombination or as suitable in any other described embodiment of the invention. Certain features described in the context of various embodiments are not to be considered essential features of those embodiments, unless the embodiment is inoperative without those elements.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present invention. To the extent that section headings are used, they should not be construed as necessarily limiting.

What is claimed is:

1. A method for computer code parallelization, comprising:
   providing sequential computer code by a user;
   defining structure of said sequential computer code, said structure comprises a plurality of code processes;
   generating automatically a plurality of parallelized computer codes corresponding to said sequential computer code, each having different configuration of parallelizing said plurality of code processes;
   running said plurality of parallelized computer codes on a multi-core processing platform;
   evaluating performance of said processing platform during running of each of said parallelized computer codes;
   ranking each of said parallelized computer codes according to said performance evaluation;
   presenting each of a plurality of processes of said sequential computer code as an execution graphic element in a schematic chart;
   presenting each of a plurality of output data blocks of said plurality of processes as a data structure graphic element of a corresponding execution graphic element in said schematic chart;
   presenting each of a plurality of dependencies between said plurality of processes as a dependency arrow between corresponding execution graphic elements in said schematic chart;
   identifying non-conflicting execution graphic elements according to said schematic chart; and
   generating at least one of said plurality of parallelized computer codes to correspond to said sequential computer code wherein processes presented by said non-conflicting execution graphic elements are paralleled.

2. The method of claim 1, further comprising:
   selecting one of said parallelized computer codes according to said ranking.

3. The method of claim 1, further comprising:
   generating a virtual multi-core processing platform, said virtual multi-core processing platform is simulated on a different processing platform using software application; and
   running said computer code on said virtual multi-core processing platform.

4. The method of claim 1, wherein said running comprises said plurality of parallelized computer codes on a plurality of processing platforms, each of said processing platforms having different properties;

wherein said evaluating comprises evaluating performance of said computer code on each of said plurality of processing platforms;
wherein said ranking is performed for each of said plurality of processing platforms.

5. The method of claim 4, wherein said computer code is a generated parallelized computer code corresponding to a previously provided sequential computer code and said plurality of processing platforms multi-core processing platforms.

6. The method of claim 1, further comprising:
presenting each of a plurality of data clusters as data structure manipulation graphic element, operating on corresponding data structure graphic element in said schematic chart.

7. A system for computer code parallelization, comprising:
at least one memory unit adapted to store at least one code;
at least one processor adapted to execute said at least one code module;
wherein said at least one code module comprising:
    code instructions receiving sequential computer code from a user; and
    code instructions defining structure of said sequential computer code, said structure comprises a plurality of code processes;
    code instructions for generating automatically a plurality of parallelized computer codes corresponding to said sequential computer code, each having different configuration of parallelizing said plurality of code processes;
    code instructions for running said plurality of parallelized computer codes on a multi-core processing platform;
    code instructions evaluating performance of said processing platform during running of each of said parallelized computer codes; and
    code instructions for ranking each of said parallelized computer codes according to said performance evaluation
wherein said at least one code module further comprises:
    code instructions for receiving sequential computer code from a user;
    code instructions for presenting each of a plurality of processes of said sequential computer code as an execution graphic element in a schematic chart;
    code instructions for presenting each of a plurality of output data blocks of said plurality of processes as a data structure graphic element of a corresponding execution graphic element in said schematic chart;
    code instructions for presenting each of a plurality of dependencies between said plurality of processes as a dependency arrow between corresponding execution graphic elements in said schematic chart;
    code instructions for identifying non-conflicting execution graphic elements according to said schematic chart; and
    code instructions for generating a parallelized computer code corresponding to said sequential computer code wherein processes presented by said non-conflicting execution graphic elements are paralleled.

8. The system of claim 7, further comprising a virtual multi-core processing platform simulated on a different processing platform using software application.

9. The system of claim 7, further comprising a plurality of evaluation code modules, each implemented on a processing platform having different properties; wherein said at least one processor are of a control server connected to said code store for running said at least one code on at least one of said plurality of evaluation modules selected by said user; wherein the system further comprises a plurality of profiler code modules included in said plurality of evaluation code modules, said plurality of profiler code modules are implemented on said processing platform for evaluating performance of said sequential computer code on at least one of said plurality of processing platforms.

* * * * *